(12) United States Patent
Dupuie

(10) Patent No.: US 7,218,713 B1
(45) Date of Patent: May 15, 2007

(54) TELEPHONE LINE INTERFACE FOR DAA CIRCUITRY

(75) Inventor: Scott T. Dupuie, Lakeway, TX (US)

(73) Assignee: Silicon Laboratories Inc., Austin, TX (US)

( * ) Notice: Subject to any disclaimer, the term of this patent is extended or adjusted under 35 U.S.C. 154(b) by 336 days.

(21) Appl. No.: 10/414,442

(22) Filed: Apr. 15, 2003

(51) Int. Cl.
*H04M 1/56* (2006.01)
*H04M 15/06* (2006.01)
*H04M 1/00* (2006.01)
*H04M 9/00* (2006.01)

(52) U.S. Cl. ............. 379/142.13; 379/142.01; 379/399.01; 379/413.01

(58) Field of Classification Search ........... 379/142.01, 379/142.04, 142.13, 142.15, 399.01, 399.02, 379/412, 413.01, 413.02
See application file for complete search history.

(56) References Cited

U.S. PATENT DOCUMENTS

| | | | |
|---|---|---|---|
| 4,224,478 A | 9/1980 | Fahey et al. | |
| 4,415,777 A | 11/1983 | Agnew | |
| 4,656,620 A * | 4/1987 | Cox ............... | 370/536 |
| 4,656,661 A | 4/1987 | Carbrey | |
| 4,686,697 A | 8/1987 | Shapiro et al. | |
| 4,975,949 A | 12/1990 | Wimsatt et al. | |
| 5,058,129 A | 10/1991 | Gupta et al. | |
| 5,086,454 A | 2/1992 | Hirzel | |
| 5,224,154 A | 6/1993 | Aldridge et al. | |
| 5,258,721 A | 11/1993 | Zanders | |
| 5,323,398 A | 6/1994 | Wake et al. | |
| 5,329,585 A | 7/1994 | Susak et al. | |
| 5,343,516 A | 8/1994 | Callele et al. | |
| 5,355,407 A | 10/1994 | Lazik | |
| 5,361,296 A | 11/1994 | Reyes et al. | |
| 5,377,260 A | 12/1994 | Long | |
| 5,390,249 A | 2/1995 | Park | |
| 5,459,721 A | 10/1995 | Yoshida | |
| 5,467,385 A | 11/1995 | Reuben et al. | |
| 5,479,120 A * | 12/1995 | McEwan ............... | 327/91 |
| 5,500,895 A | 3/1996 | Yurgelites | |
| 5,546,448 A | 8/1996 | Caswell et al. | |
| 5,553,138 A | 9/1996 | Heald et al. | |
| 5,555,100 A | 9/1996 | Bloomfield et al. | |
| 5,563,942 A | 10/1996 | Tulai | |
| 5,574,749 A | 11/1996 | Nelson et al. | |
| 5,592,529 A | 1/1997 | Linsker | |

(Continued)

OTHER PUBLICATIONS

Copending Application entitled "Integrated Modem And Line-Isolation Circuitry And Associated Method Having Intrusion Detection," Filed Jun. 26, 2000, U.S. Appl. No. 09/603,037, 37 pgs.

(Continued)

*Primary Examiner*—Quoc Tran
(74) *Attorney, Agent, or Firm*—O'Keefe, Egan, Peterman & Enders LLP

(57) ABSTRACT

A telephone line interface and associated circuitry that may be implemented to simultaneously couple DC loop voltage, ring bursts, and caller-ID data to the phone line side of a DAA circuit through a single two wire resistively coupled interface. The interface and circuitry may be implemented to combine processing of the DC loop voltage and ring bursts into a single circuit, with processing of caller-ID data being performed separately.

37 Claims, 12 Drawing Sheets

U.S. PATENT DOCUMENTS

| | | |
|---|---|---|
| 5,644,629 A | 7/1997 | Chow |
| 5,654,984 A | 8/1997 | Hershbarger et al. |
| 5,655,010 A | 8/1997 | Bingel |
| 5,675,640 A | 10/1997 | Tappert et al. |
| 5,694,465 A | 12/1997 | Apfel |
| 5,774,541 A | 6/1998 | Krause |
| 5,790,656 A | 8/1998 | Rahamim et al. |
| 5,796,815 A | 8/1998 | Guercio et al. |
| 5,805,687 A | 9/1998 | Westergaard et al. |
| 5,815,567 A | 9/1998 | Davis et al. |
| 5,818,216 A | 10/1998 | MacDonald |
| 5,841,840 A | 11/1998 | Smith et al. |
| 5,870,046 A | 2/1999 | Scott et al. |
| 5,875,235 A | 2/1999 | Mohajeri |
| 5,901,210 A | 5/1999 | Schley-May |
| 5,907,596 A | 5/1999 | Karnowski |
| 5,991,335 A | 11/1999 | Price |
| 6,005,923 A | 12/1999 | Lee |
| 6,104,794 A | 8/2000 | Hein et al. |
| 6,137,827 A | 10/2000 | Scott et al. |
| 6,160,885 A * | 12/2000 | Scott et al. ............ 379/399.01 |
| 6,198,816 B1 | 3/2001 | Hein et al. |
| 6,222,922 B1 * | 4/2001 | Scott et al. .................. 379/377 |
| 6,295,347 B1 * | 9/2001 | Fan et al. .............. 379/142.01 |
| 6,298,133 B1 | 10/2001 | Hein et al. |
| 6,351,530 B1 * | 2/2002 | Rahamim et al. ...... 379/399.01 |
| 6,385,235 B1 | 5/2002 | Scott et al. |
| 6,456,712 B1 | 9/2002 | Hein et al. |
| 6,480,602 B1 * | 11/2002 | Dupuis et al. ......... 379/399.01 |
| 6,522,745 B1 | 2/2003 | Tuttle et al. |

OTHER PUBLICATIONS

Silicon Laboratories, Si3044 ; "3.3V Enhanced Global Direct Access Arrangement," Rev. 2.01; Sep. 2001; 72pgs.

Silicon Laboratories, Si3034; "3.3 V Global Direct Access Arrangement," Rev. 2.01; Sep. 2001; 66 pgs.

Silicon Laboratories, Si3032; "Direct Digital Access Arrangement (DDAA)," Rev. 0.8; Nov. 1997; 25 pgs.

* cited by examiner

IMPLEMENTATION OF RINGER/CALLER-ID INTERFACE

TELEPHONE LINE INTERFACE FOR DAA CIRCUITRY

TECHNICAL FIELD OF THE INVENTION

This invention relates to the field of digital access arrangement circuitry. More particularly, this invention relates to telephone line side circuitry used with digital access arrangement circuitry.

BACKGROUND

Electrical isolation barriers can be identified in many industrial, medical and communication applications where it is necessary to electrically isolate one section of electronic circuitry from another electronic section. In this context, isolation exists between two sections of electronic circuitry if a large magnitude voltage source (typically on the order of 1000 volts or more) connected between any two circuit nodes separated by the barrier causes less than a minimal amount of current flow (typically on the order of 10 milliamperes or less) through the voltage source. An electrical isolation barrier must exist, for example, in communication circuitry that connects directly to the standard two-wire public switched telephone network and that is powered through a standard residential wall outlet.

Direct Access Arrangement (DAA) circuitry may be used to terminate the telephone connections at a phone line user's end to provide a communication path for signals to and from the phone lines. DAA circuitry includes the necessary circuitry to terminate the telephone connections at the user's end and may include, for example, an isolation barrier, DC termination circuitry, AC termination circuitry, ring detection circuitry, and processing circuitry that provides a communication path for signals to and from the phone lines. It is also desirable that the DAA circuitry act as an isolation barrier to meet the requirements of FCC regulations, Part 68. Examples of DAA circuitry known in the art may be found described in U.S. Pat. No. 6,198,816, U.S. Pat. No. 6,298,133, U.S. Pat. No. 6,385,235 and in U.S. patent application Ser. No. 09/347,688 filed Jan. 2, 1999 and entitled "DIGITAL ACCESS ARRANGEMENT CIRCUITRY AND METHOD HAVING A SYNTHESIZED RINGER IMPEDANCE FOR CONNECTING TO PHONE LINES" by Tuttle et al., the disclosure of each being incorporated herein by reference.

In traditional DAA designs, a separate interface and circuit is typically required for each of loop voltage monitoring, ring burst detection and caller-ID demodulation. This is generally due to the significantly different voltage levels and frequencies involved in these signaling schemes. Furthermore, the ringer interface is often nonlinear which makes it unsuitable for measuring loop voltage or detecting caller-ID data. Implementing three interfaces requires numerous high voltage external components that increases both cost and board space usage. The separate circuits required also consume considerable power.

Loop voltage levels on the TIP and RING lines may be monitored for a number of reasons. For example, such levels may be utilized for on-hook or off-hook intrusion detection or determining other states of the phone line. Exemplary uses of DC loop voltage (also called DC line voltage) data may be seen in co-pending U.S. patent application Ser. No. 09/603,037, filed Jun. 26, 2000 and entitled "INTEGRATED MODEM AND LINE-ISOLATION CIRCUITRY AND ASSOCIATED METHOD HAVING INTRUSION DETECTION" by Timothy J. Dupuis, which is incorporated herein by reference.

In the past, a capacitive interface has been used to connect the ringer circuitry on the phone line side of the DAA directly to the TIP/RING Lines as described in U.S. Pat. No. 6,198,816. The capacitive interface linearly attenuates the TIP/RING signal voltage from high phone lines levels (typically 40–140 Vrms, 15–68 Hz) to levels within integrated circuit technology limitations. Because the interface provides a linear signal, it may also be connected to caller ID circuitry to demodulate caller ID data as described in U.S. Pat. No. 6,298,133, which has been incorporated herein by reference. The use of common inputs for the ringer circuitry and the caller-ID circuitry eliminates the need for a separate caller ID interface. However, the interface cannot pass DC signals, and a separate interface is required for loop voltage monitoring. This has typically been accomplished using a resistive interface connected to the hook switch circuitry.

An example of a prior art telephone system utilizing capacitive isolation barriers and configured for performing ring burst detection and caller-ID demodulation or analog to digital conversion is described below with reference to FIGS. 3 and 4. As illustrated, this system employs one interface for the separate ringer circuitry and the separate caller-ID circuitry. Not shown in FIGS. 3 and 4 is an additional interface and separate circuitry employed for loop voltage monitoring. Thus, in this prior art telephone system, two unique interfaces and three separate circuits are used to perform loop voltage monitoring, ring burst detection and caller-ID demodulation or analog to digital conversion.

As shown in FIG. 3, the TIP line 1602 and RING line 1604 are provided to the prior art communication system 110. The diode bridge 1606 receives the TIP line 1602 and RING line 1604 and provides an output to the external hookswitch devices 1702. A communication line 1705 couples the external hookswitch devices to the line side circuits 118. The line side circuits 118 are circuits isolated from external powers sources, such as power source 112, by an isolation barrier 120. The isolation barrier 120 may be a capacitive isolation barrier as previously described.

As shown in the prior art configuration of FIG. 3, phone line interface circuitry, such as a hookswitch, caller ID and ringer interface circuit 1704 is provided within the line side circuitry 118. The hookswitch, caller ID and ringer interface circuitry 1704 is coupled to the external hookswitch devices through line 1705 and ground through line 1707. The phone line loop current utilized by the line side circuits 118 is shown as $I_{loop}$. Circuitry 1704 is also coupled directly to the TIP line 1602 and the RING line 1604 through a capacitive interface 1703. The capacitive interface 1703 may be comprised of three high voltage (such as 300 V) capacitors 1703a, 1703b, and 1703c having capacitances of 2200 pF, 2200 pF and 5600 pF respectively, and linearly attenuates the TIP/RING signal voltage from high phone lines levels (typically 40–140 Vrms, 15–68 Hz) to levels within integrated circuit technology limitations. Bi-directional input/output lines 1706 are shown provided from the hookswitch, caller ID and ringer interface circuitry 1704 for communication through the isolation barrier 120 to the user powered circuits 116.

The user powered circuits 116 of prior art communication system 110 include ringer timing circuitry 1708. The ringer timing circuitry may bidirectionally communicate through line 1710 and the isolation barrier 120 to ringer circuits within the hookswitch, caller ID and ringer interface circuitry 1704 in the line side circuit 118. The ring detection output is provided on output line 1719 to a ring detection output pin 1720 of the user powered circuit 116. Alternatively, the ring detection output 1719 may be provided at the analog-to-digital converter ("ADC") data port pin 1718 by use of a mux 1716. Mux 1716 may be utilized to multiplex the ringer detection output 1719 and a signal line 1712 containing caller ID data from an ADC output from the line side circuit 118. The mux 1716 may operate in response to a caller ID field signal 1714 so that when caller ID information is present on the TIP and RING lines, caller ID information is presented at the ADC data port pin 1718 and when ringing information is present on the TIP and RING lines, ring detection information is presented at the ADC data port pin 1718. In this manner the ADC data port may reflect activity on the TIP/RING loop during ringing, caller ID fields, and off-hook operations.

FIG. 4 illustrates a more detailed view of some of the circuits of the hookswitch, caller ID and ringer interface circuitry 1704 of prior art communication system 110. As shown in FIG. 4, input line 1705 provides the TIP and RING signal information to integrated hookswitch circuits 1810. The integrated hookswitch circuits 1810 are those portions of the hookswitch circuitry integrated within the line side integrated circuit 118 (as opposed to portions of the hookswitch circuitry which may be off chip as designated by the external hookswitch devices 1702 as shown in FIG. 3). The ground line 1707 is also coupled to the integrated hookswitch circuits 1810. The TIP and RING information is also coupled into circuitry 1704 through a capacitive interface 1703. The TIP and RING information coupled through the capacitive interface 1703 may be provided to a ringer burst circuit 1802 and to a mux 1812. The mux 1812 operates in response to a control signal 1815. The control signal 1815 may be provided to indicate when caller ID information is present on the TIP and RING lines. Thus when caller ID information is present on the phone line, the caller ID information may be provided from the TIP and RING lines to an ADC 1814 for conversion to digital data which may then be transmitted across the isolation barrier 120. In other cases when caller ID information is not present (such as in an offhook situation), the mux 1812 may provide data from the integrated hookswitch circuits to the ADC 1814 for conversion to digital data which may then be transmitted across the isolation barrier 120. A power supply line 1816 may be provided to a variety of circuits such as the mux 1812 and the ADC 1814 from power obtained from the phone line through the hookswitch circuits. The power may be supplied even in conditions when the hookswitch is not normally closed (an on-hook condition). Bi-directional communication from the ringer burst circuit 1802 to the user powered circuit 116 may be provided on communication line 1817 through the isolation barrier as also discussed below in further detail.

As shown in FIG. 4, outputs 1703d and 1703e of the capacitive interface 1703 are coupled to ringer burst circuitry 1802 and are also connected to caller ID circuitry input lines 1804 and 1806 so that accurate caller ID data from the TIP/RING signals may be present on caller ID input lines 1804 and 1806, with the caller ID information being then provided from lines 1804 and 1806 to a mux 1812. In an alternate prior art configuration (not shown), a separate dedicated ADC may be coupled to capacitive interface outputs 1703d and 1703e for receiving, digitally converting and transmitting caller ID data across isolation barrier 120, i.e., rather than using ADC 1814 for this purpose. As further shown with respect to the prior art communication of FIGS. 3 and 4, loop current ($I_{loop}$) may be drawn from the TIP line 1602 and the RING line 1604 through interface lines 1705 and 1707, with virtually no (less than 10 uA) loop current being drawn during a ringing burst and only on-hook loop current being drawn during the caller ID field.

FIG. 5 illustrates an alternative prior art implementation of a combined ringer/caller-ID interface and associated circuitry 500 that may be implemented in a telephone system that employs two unique interfaces and three separate circuits to perform loop voltage monitoring, ring burst detection and caller-ID demodulation or analog to digital conversion. In FIG. 5, components to the left of the dotted line are off-chip and elements to the right are implemented on the line side chip of DAA circuitry. As illustrated, caller ID circuitry 510 and ringer circuitry 530 are coupled to the TIP and RING lines through a capacitive interface 550 that includes capacitors C1 (i.e., C1A, C1B) and C2. Capacitive interface 550 functions in a manner similar to capacitive interface 1703 of FIG. 4. The linear division factor is set by the ratio of C1 to C2 and is typically selected to insure that the DAA circuitry does not overload before the maximum ring threshold is exceeded. R1 determines the corner frequency of the highpass filter formed by R1, C1, and C2 and is typically selected such that the lowest frequency ring burst is passed without significant attenuation. R2 is utilized to protect the PAD diodes in the line side chip from excessive current during lightning strikes or other surges.

As illustrated in FIG. 5, one interface is shared between the ringer and caller-ID functions, however separate circuitry is used on chip. In this regard, the ringer circuit is a simple window comparator 530 that detects when the voltage on the line exceeds a certain preset positive or negative threshold thus causing ring detection signals RDTP or RDTN to go high, respectively. These signals are then sent across the isolation barrier of the DAA circuitry to circuitry within the system side chip that performs ring validation and generates timing signals indicating the location of caller-ID data between the first and second ring burst. As illustrated in FIG. 5, the much smaller magnitude caller-ID signals are converted to digital format in a $2^{nd}$ order delta-sigma ADC 510 coupled to the interface through gain block 520. The resulting bit stream is sent across the isolation barrier to the system side chip for decimation or analog to digital conversion of the caller-ID data.

Still referring to the prior art implementation of FIG. 5, the placement of the more complex ring validation, timing, decimation, and caller-ID decoding circuitry on the system side chip results in lower power dissipation on the line side. This is desirable since it minimizes the circuitry on the line side chip, which decreases the amount of power that must be transmitted across the isolation barrier and minimizes the common-mode noise transmitted to the TIP/RING lines.

Although not shown in FIGS. 3–5, prior art loop voltage interface and circuitry have been implemented in such prior art systems using components both on and off the line side chip. In such prior art circuitry, the loop voltage is converted to digital format in a simple switched capacitor dual-slope counting ADC. The resulting PCM data is sent across the isolation barrier to the system side chip. Further details on such prior art loop voltage interface and circuitry may be found in co-pending U.S. patent application Ser. No. 09/603,037, filed Jun. 26, 2000 and entitled "INTEGRATED MODEM AND LINE-ISOLATION CIRCUITRY AND ASSOCIATED METHOD HAVING INTRUSION DETECTION" by Timothy J. Dupuis.

To summarize, in previous DAA implementations at least two unique interfaces and three separate circuits are required to simultaneously perform loop voltage monitoring, ring burst detection, and caller-ID demodulation. With regard to the combined ringer/caller-ID interface and circuitry shown in FIG. 5, three external capacitors and four external resistors are required. Furthermore, high voltage capacitors (e.g. 300 v) employed in the capacitive interface of prior art telephone communication systems are relatively expensive. In addition, large ring signals or a battery reversal can cause the protection diodes in the line side chip to turn on resulting in charge storage in the external capacitors. Once the protection diodes turn on the capacitive voltage divider ceases to operate linearly. Since caller-ID data should be processed within 100 msec of a battery reversal, some means must be provided to squelch or reset, the charge on these capacitors after an over voltage event. With regard to the loop voltage interface and circuitry of the prior art, the hookswitch must be off (i.e., telephone device on hook) in order to measure the loop voltage since the interface is shared with the hookswitch circuits.

SUMMARY OF THE INVENTION

Disclosed herein is a telephone line interface and associated circuitry that may be implemented to simultaneously couple DC loop voltage, ring bursts, and caller-ID data to the phone line side of a DAA circuit through a single two wire resistively coupled interface capable of passing DC signals. When compared to prior art circuit architectures, the disclosed interface and circuitry may be advantageously implemented to achieve a significant reduction in external components required to implement loop voltage monitoring, ring burst detection and caller-ID demodulation, thus resulting in lower system cost. Further advantageously, system cost and power requirements may be further reduced by combining the processing of DC loop voltage and ring bursts into a single circuit while processing caller-ID data separately. In such an embodiment, the disclosed telephone line interface and associated circuitry may be implemented to perform loop voltage monitoring, ring burst detection and caller-ID demodulation using two separate circuits, rather than three separate circuits.

In one embodiment, the disclosed telephone line interface and circuitry may employ a single combined interface to couple DC loop voltage, ring bursts, and caller-ID data to the line side of the DAA. In this embodiment, the number of external components may therefore be reduced, resulting in minimized cost, reduced board space usage, and reduced number of pins required on the DAA line side integrated circuit. The combined interface of this embodiment may also be implemented to facilitate sharing of the circuitry in the DAA that performs conversion, detection, or decoding of the various signals. This in turn enables lower power dissipation and minimizes the common-mode noise transmitted to the TIP/RING lines. DC coupling also ensures that no caller-ID signal ("CID") squelching is required after a large ring burst or battery reversal.

In another embodiment, the disclosed telephone line interface and circuitry may employ a differential interface that is separate from the hookswitch circuitry of the DAA, allowing loop voltage to be measured both on and off-hook. This capability may be advantageously implemented to provide both on and off-hook loop voltage measurement for parallel handset detection, enabling bipolar loop voltage measurement to detect polarity reversals, increasing the load impedance to meet global DC impedance requirements, and improving the accuracy and resolution of the loop voltage monitor relative to prior art circuitry (i.e., previously 5 bits, 2.75 V per LSB ±20% full scale accuracy). The differential configuration of the disclosed telephone line interface and circuitry is also more immune to external noise sources than prior art interface configurations, making the disclosed circuit architecture more robust.

In yet another embodiment, the disclosed telephone line interface and circuitry may include combined loop voltage monitoring and ringer detection circuitry that employs a single $1^{st}$ order delta-sigma analog to digital converter ("ADC") for both DC loop voltage monitoring and ring burst detection, and may include caller ID circuitry that employs a $2^{nd}$ order delta-sigma ADC for caller-ID decoding. Using this configuration, only fault tolerant delta-sigma bitstreams are transmitted across the isolation barrier of a DAA, thus making the architecture relatively immune to random bit errors in the link. Furthermore, the more complex features of ring validation, timing, decimation and caller-ID decoding may be located on the system side chip, enabling lower power dissipation on the line side and minimizing the common-mode noise transmitted to the TIP/RING lines of the DAA. A highpass filter may be coupled in front of the $2^{nd}$ order caller-ID delta-sigma ADC to ensure that the ring threshold is independent of the DC loop voltage.

Advantageously, using the disclosed interface and circuitry, the hookswitch may remain closed (i.e., telephone device off-hook) when implemented in systems requiring off hook voltage measurement, e.g., where parallel handset detection is desired. Since the loop voltage interface is not shared with the hookswitch circuitry, polarity of the loop voltage may be determined. Further advantageously, the disclosed interface and circuitry may be configured to meet current global on-hook DC impedance requirements (e.g., 5 µA at 100 V). Finally, the disclosed interface design does not require separate loop voltage measurement circuitry in the line side chip and reduces the number of off chip components resulting in decreased cost, decreased board space usage, and reduced power dissipation.

In one respect, disclosed herein is a communication system, including: phone line side circuitry that may be coupled to a telephone network; ringer detection circuitry included within the phone line side circuitry; loop voltage monitoring circuitry included within the phone line side circuitry; and caller ID circuitry included within the phone line side circuitry; wherein the ringer detection circuitry, loop voltage monitoring circuitry and caller ID circuitry are configured to be coupled to the telephone network through a common interface.

In another respect, disclosed herein is an interface architecture for connecting an integrated circuit to a phone line, including: a caller ID circuitry input; a ring detection circuitry input; a loop voltage monitoring circuitry input; and a common integrated circuit input node coupled to each of the caller ID circuitry input, ring detection circuitry input and loop voltage monitoring circuitry input, the inputs configured to receive a common attenuated signal representative of data on TIP and RING phone lines.

In another respect, disclosed herein is a method for providing caller ID, loop voltage and ringer data from a telephone network to phone line circuitry coupled to the telephone network through an interface, including: providing caller ID data from the telephone network to caller ID circuitry included within the phone line circuitry; providing loop voltage data from the telephone network to loop voltage monitoring circuitry included within the phone line circuitry; and providing ringer data from the telephone network to ring detection circuitry within the phone line circuitry; wherein the ringer detection circuitry, loop voltage monitoring circuitry and caller ID circuitry of the phone line circuitry are coupled to the telephone network through a common interface, and wherein the caller ID data, the loop voltage data and the ringer data are provided from the telephone network to the phone line circuitry through the common interface.

In another respect, disclosed herein is a communication system, including: phone line side circuitry that may be coupled to a telephone network; and combined loop voltage monitoring and ringer detection circuitry included within the phone line side circuitry.

In another respect, disclosed herein is a method of operating a communication system that may be coupled to a telephone network, including: providing phone line side circuitry, the phone line circuitry including combined loop voltage monitoring and ringer detection circuitry within the phone line circuitry; and providing loop voltage data and ringer data from the telephone network to the combined loop voltage monitoring and ringer detection circuitry included within the phone line circuitry.

DESCRIPTION OF THE DRAWINGS

So that the manner in which the herein described advantages and features of the present invention, as well as others which will become apparent, are attained and can be understood in detail, a more particular description of the invention summarized above may be had by reference to the embodiments thereof which are illustrated in the appended drawings, which drawings form a part of this specification.

It is noted, however, that the appended drawings illustrate only exemplary embodiments of the invention and are therefore not to be considered limiting of its scope, for the invention may admit to other equally effective embodiments.

DESCRIPTION OF ILLUSTRATIVE EMBODIMENTS

Figure 1:
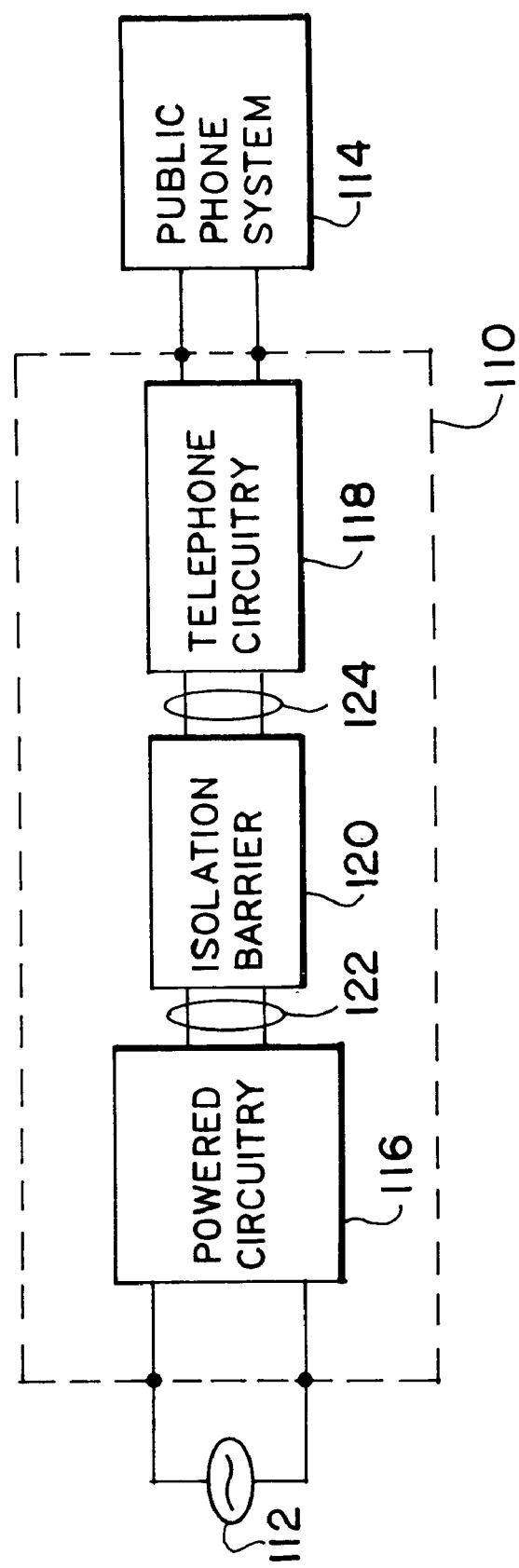
FIG. 1 is a block diagram of a telephone line connection circuitry according to one embodiment of the disclosed systems and methods.

In order to provide a context for understanding this description, FIG. 1 illustrates a typical application for the present invention: circuitry that includes circuitry powered by a source external to the phone system. A basic telephone line side circuit 118 is connected to the public telephone system and does not have a separate power connection. DAA circuitry 110 for coupling to a phone line may be used with or incorporated within devices including, but not limited to, radio (cordless), modem, speakerphone, and answering machine devices that may require an external source of power 112, typically obtained by plugging the phone (or a power supply transformer/rectifier) into a typical 110-volt residential wall outlet. In order to protect public phone system 114 (and to comply with governmental regulations), it is necessary to isolate "powered circuitry" 116 that is externally powered from "isolated circuitry" 118 (isolated circuitry may also be called telephone line side circuit) that is connected to the phone lines, to prevent dangerous or destructive voltage or current levels from entering the phone system (similar considerations exist in many other applications as well, including communication, medical and instrumentation applications in which this invention may be beneficially applied). The required isolation is provided by isolation barrier 120. The signal that passes through the isolation barrier 120 may be a digital or analog signal. In some applications, communication across isolation barrier 120 may be unidirectional (in either direction), but in many applications, including telephony, bi-directional communication is required. Bi-directional communication may be provided using a pair of unidirectional isolator channels, or by forming a single isolation channel and multiplexing bi-directional signals through the channel. The primary requirements placed on isolation barrier 120 are that it effectively prevents harmful levels of electrical power from passing across it, while accurately passing the desired signal from the powered side 122 to the isolated side 124, or in the reverse direction if desired.

Figure 2:
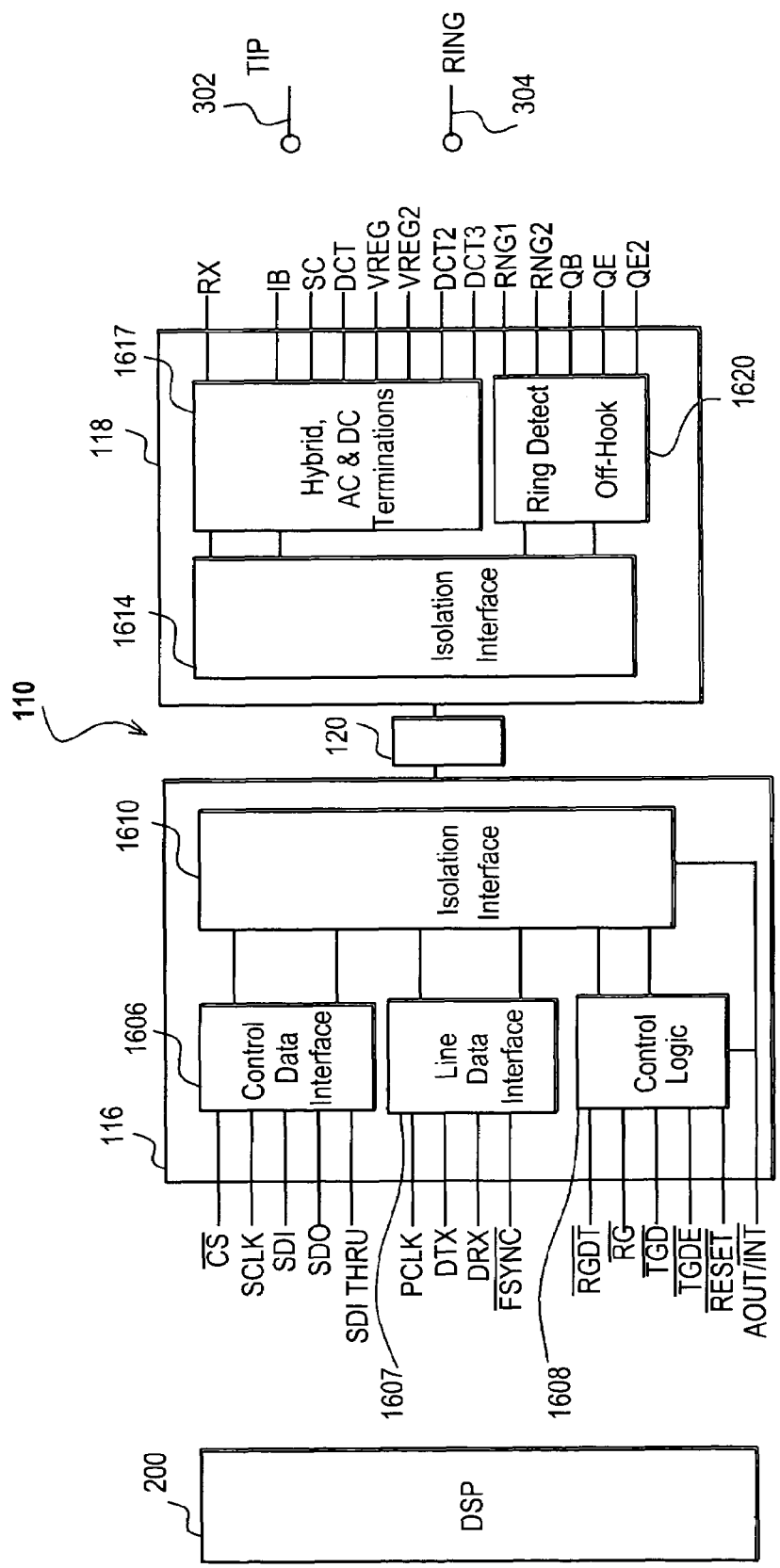
FIG. 2 is a general block diagram of digital DAA circuitry including phone line side circuitry, an isolation barrier, and powered side circuitry according to one embodiment of the disclosed systems and methods.
Figure 3:
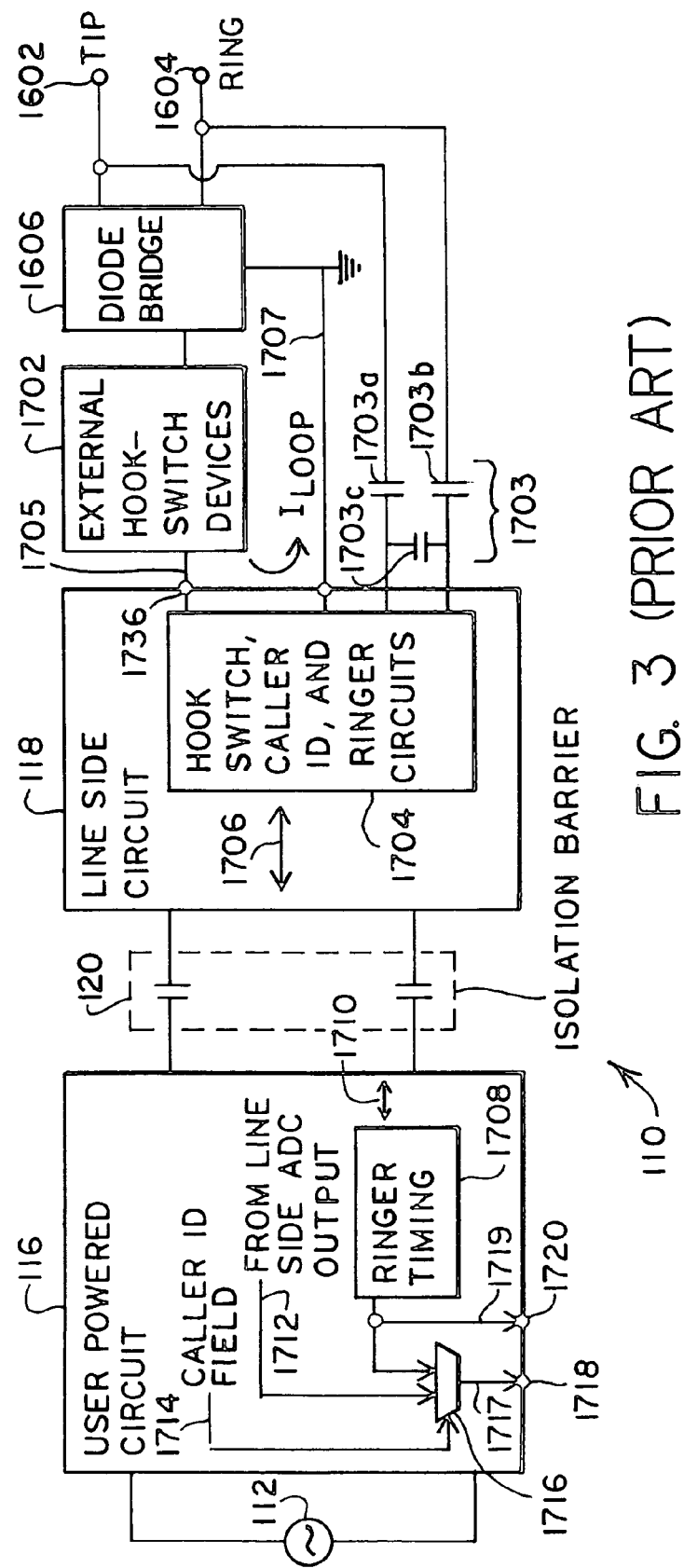
FIG. 3 illustrates a prior art telephone communication system.
Figure 4:
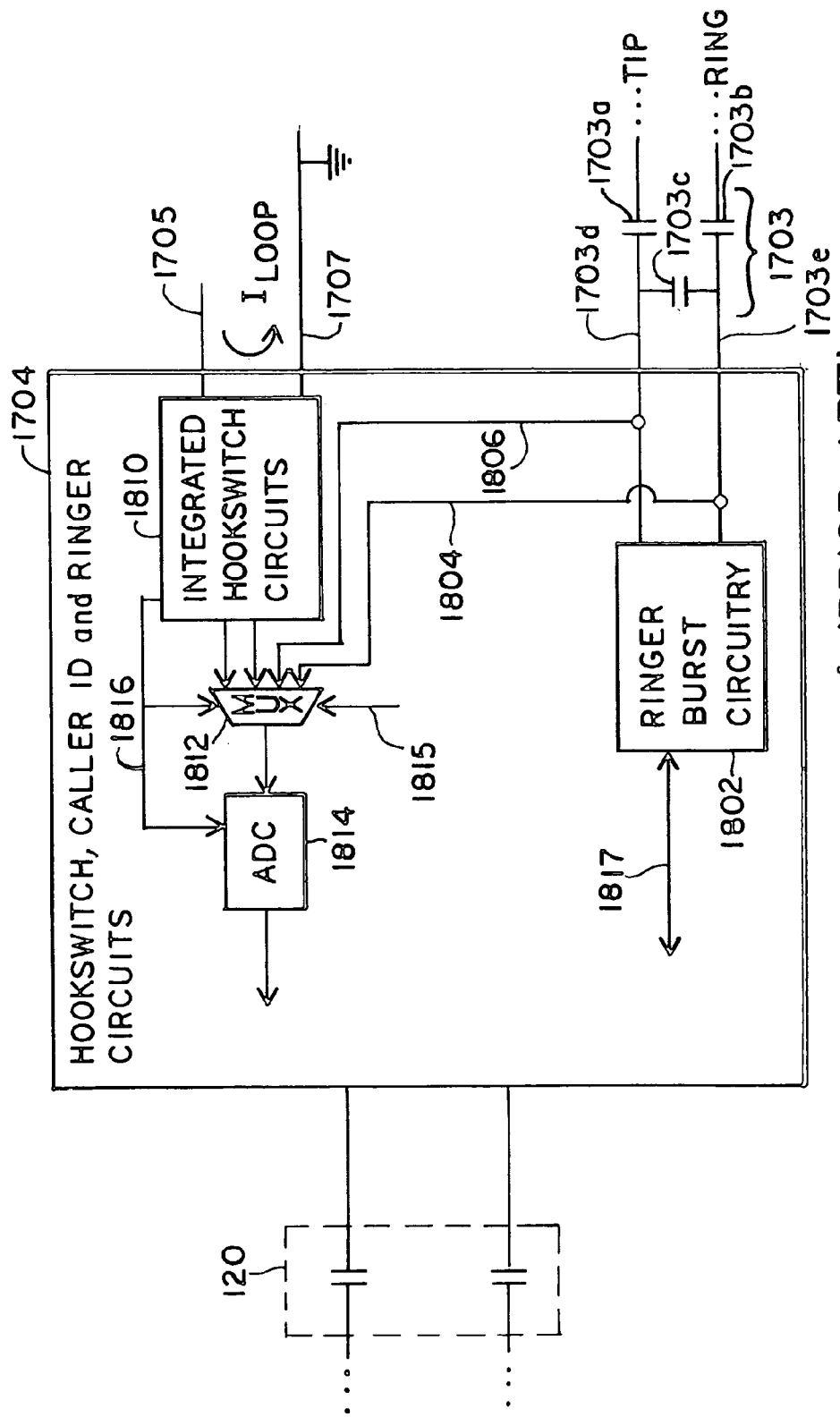
FIG. 4 illustrates hookswitch, caller ID and ringer circuits of a prior art telephone communication system.
Figure 5:
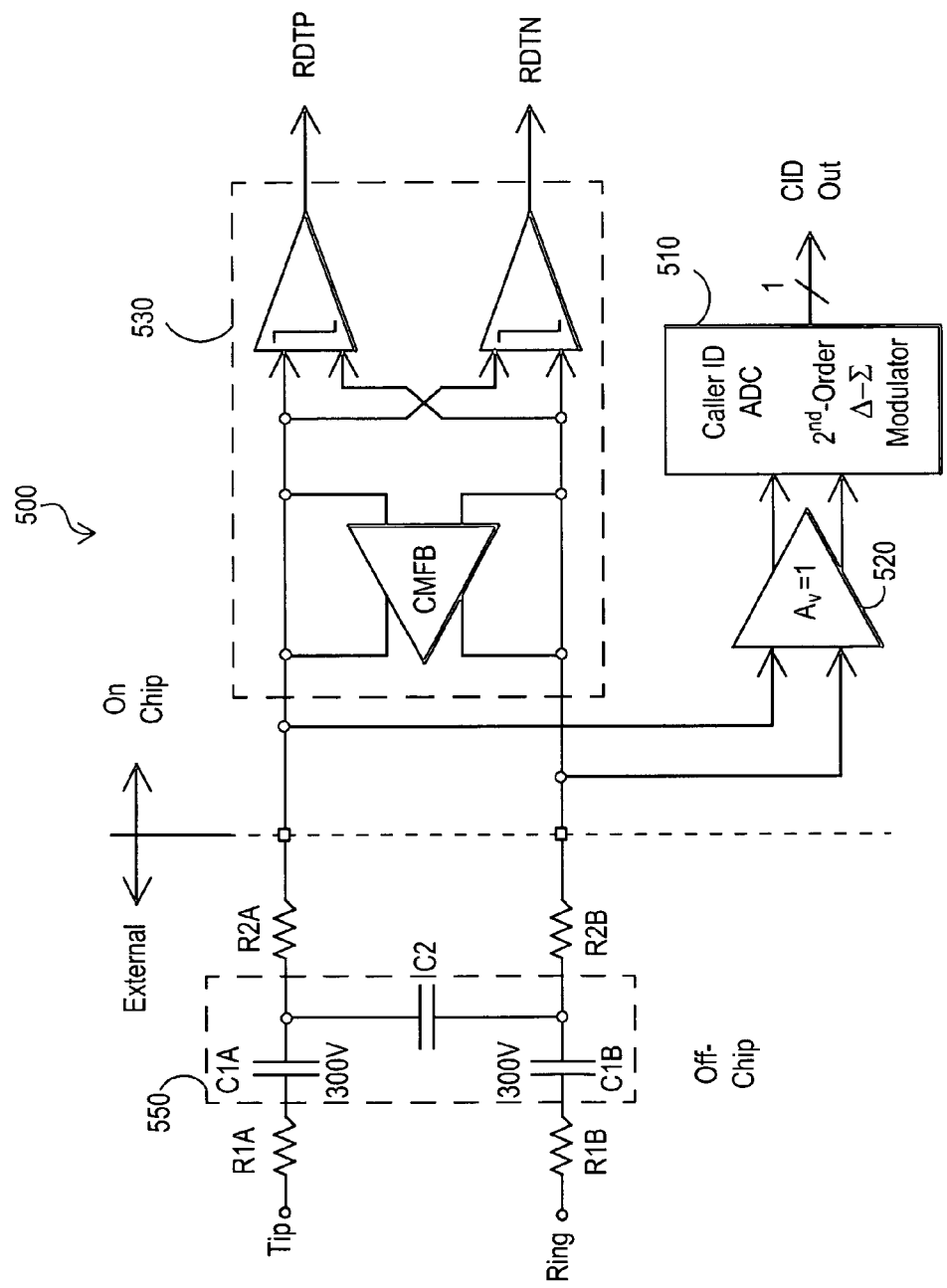
FIG. 5 illustrates combined caller ID and ringer circuits of another prior art telephone communication system.

FIG. 2 is a general block diagram of digital DAA circuitry 110 including telephone line side circuit 118, an isolation barrier 120, and powered side circuitry 116 according to the present invention. The isolation barrier 120 may include any device or combination of devices suitable for providing the required isolation, and also allowing for the transmission of digital information between the isolation interface 1614 in the phone line side circuitry and the isolation interface 1610 in the powered side circuitry. In this regard, isolation barrier 120 may include, for example, one or more capacitors, one or more transformers, opto-isolators, combinations thereof, etc. The telephone line side circuit 118 may be connected to phone lines of a telephone network system (e.g., public telephone system, PBX network, etc.), and the powered side circuitry 116 may be connected to external controllers (e.g., including, but not limited to, digital signal processor (DSP) 200) that may be part of a communication device, such as a phone or modem. Further exemplary details on coupling powered side circuitry to a DSP may be found illustrated and described in relation to the exemplary embodiment of FIG. 7.

The powered side circuitry 116, which may be implemented as an integrated circuit (IC), may communicate with the external controller through a control data interface 1606, a line data interface 1607 and control logic 1608. In addition, the control data interface 1606, line data interface 1607 and the control logic 1608 are connected to the isolation interface 1610 so that control, status, signal and other desired information may be transmitted to and received from the telephone line side circuit 118 across the isolation barrier 120.

In the embodiment depicted, the control data interface 1606 and line data interface 1607 may have a number of external pins providing a serial port interface to the external controller, such as serial port data input pin (SDI) for providing serial port control data input, serial port data output pin (SDO) for providing serial port control data output, serial port bit clock input pin (SCLK) for controlling the serial data on SDO and for latching the data on SDI, chip select input pin (CS_bar) (it is noted that the suffix "_bar" is used to denote a signal that is typically asserted when at a low logic level) for providing an active low input control signal that enables the SPI Serial port (when inactive, SCLK and SDI are ignored and SDO is high impedance), SDI passthrough output pin (SDITHRU) for providing cascaded SDI output signal to daisy-chain the SPI interface with additional devices, master clock input pin (PCLK) for providing a master clock input, transmit PCM or GCI highway data output pin (DTX) for outputting data from either the PCM or GCI highway bus, receive PCM or GCI highway data input pin (DRX) for receiving data from either the PCM or GCI highway bus, and frame sync input pin (FSYNC_bar) for providing a data framing signal that is used to indicate the start and stop of a communication/data frame.

Similarly, the control logic 1608 may have a number of external pins providing control and status information to and from the external controller, such as ring detect output pin (RGDT_bar) for producing an active low rectified version of the ring signal, ring ground output pin (RG_bar) for providing a control signal for ring ground relay, (may be used to support ground start applications), TIP ground detect input pin (TGD_bar) for detecting current flowing in TIP for supporting ground start applications, TIP ground detect enable output pin (TGDE_bar) for providing a control signal for the ground detect relay (may be used to support ground start applications), reset input pin (RESET_bar) for providing an active low input that may be used to reset all control registers to a defined initialized state (may also be used to bring powered side circuitry 116 out of sleep mode), and analog speaker output/interrupt output pin (AOUT/INT) for providing an analog output signal for driving a call progress speaker in AOUT mode (alternatively may be set to provide a hardware interrupt signal).

The telephone line side circuit 118, which may be implemented as an integrated circuit (IC), may communicate with the phone lines through hybrid, AC and DC termination circuitry 1617 (the DC termination circuitry also provides an internal power supply voltage), and determine ring-detect and off-hook status information through off-hook/ring-detect block 1620. In addition, the hybrid, AC and DC termination circuitry 1617 and the off-hook/ring-detect block 1620 are connected to the isolation interface 1614 so that control, status, signal and other desired information may be transmitted to and received from the powered side circuitry 116 across the isolation barrier 120.

In the embodiment depicted, the hybrid portion of hybrid, AC and DC termination circuitry 1617 has a receive input pin (RX) for providing the receive side input from the telephone network, an internal bias pin (IB) for providing a bias voltage to the device, a SC Connection pin (SC) for sensing a surge event and activating a clamp, DC termination pins (DCT, DCT2 and DCT3) for providing DC termination to the telephone network, a voltage regulator pin (VREG) for connecting to an external capacitor to provide bypassing for an internal power supply, and a voltage regulator 2 pin (VREG2) for connecting to an external capacitor to provide bypassing for an internal power supply.

The off-hook/ring-detect block 1620 may have external input pins allowing status information to be provided concerning phone line status information (RNG1, RNG2), such as ring and caller identification signals. For example, the first ring detect pin (RNG1) may connect to the TIP (T) lead 302 of the phone line through a resistor, and the second ring detect pin (RNG2) may connect to the ring (R) lead 304 of the phone line through a resistor. Further exemplary details on coupling a telephone line circuit to TIP and RING leads of a phone line may be found illustrated and described in relation to the exemplary embodiment of FIG. 7. In addition, off-hook/ring-detect block 1620 may have external transistor emitter output pins (QE, QE2) and transistor base pin (QB) that control external off-hook circuitry to enter, for example, an off-hook state or a limited power mode to get caller identification information. More particularly, the transistor emitter output pins (QE, QE2) may be connected to respective emitters of bipolar transistors within external hook-switch circuitry, and the transistor base output pin (QB) may be connected to a base of a bipolar transistor within external hook-switch circuitry.

Figure 6A:
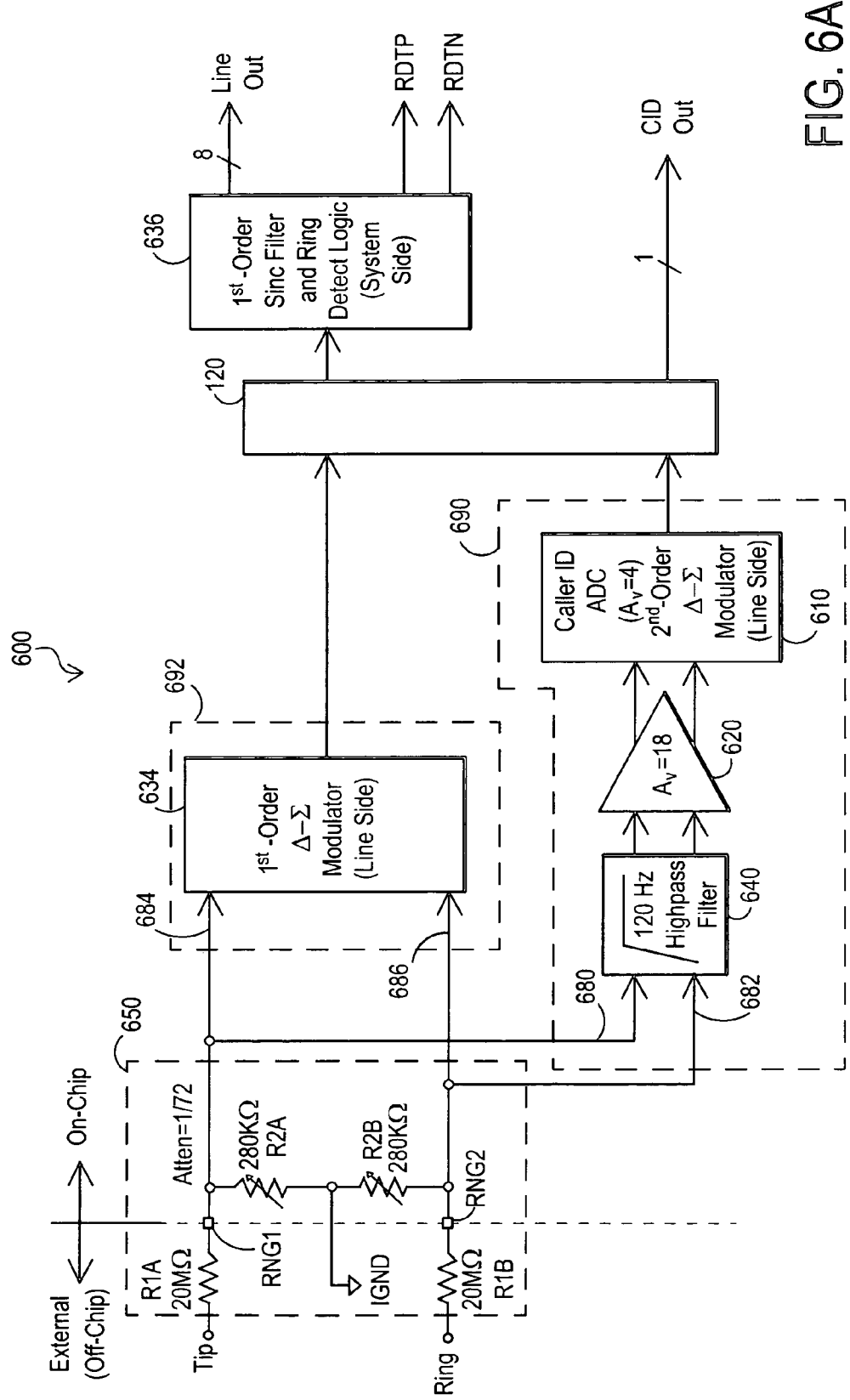
FIG. 6A is a circuit diagram of a telephone line interface and circuitry according to one embodiment of the disclosed systems and methods.

FIG. 6A shows a simplified diagram of one embodiment of the disclosed telephone line interface and circuit architecture 600, with components to the left of the dashed line being off-chip and elements to the right side being implemented on the line side chip (except for isolation barrier 120 and those elements indicated to be implemented on the system side chip). Integrated circuit input pins RNG1 and RNG2 are provided as shown. It will be understood that FIG. 6A illustrates just one exemplary embodiment of how the elements of telephone line interface and circuit architecture 600 may be implemented in line side and system side circuits of a DAA, and that one or more elements shown in FIG. 6A to be implemented on line side of the DAA may be alternatively implemented on the system side of the DAA and vice-versa. As illustrated, the circuitry of FIG. 6A includes a resistive interface circuit block 650 that includes resistors R1 (i.e., R1A, R1B) and varistors R2 (i.e., R2A, R2B). As shown, varistors R2 (i.e., R2A, R2B) may be coupled between isolated ground ("IGND") and the TIP and RING through integrated circuit pins RNG1 and RNG2 and through resistors R1 (i.e., R1A, R1B).

Resistive interface circuitry block 650 is capable of passing direct current, and therefore may be implemented as a combined interface for coupling DC loop voltage, ring bursts and caller-ID data to the line side chip of DAA circuitry. In one exemplary embodiment, resistive interface circuit block 650 may linearly attenuate the TIP/RING voltage from relatively high phone line levels (e.g., about 48 VDC, 40–140 Vrms) to levels within integrated circuit technology limitations (e.g., about 0.67 VDC, 0.5–2 Vrms). The division factor is set by the ratio of R1 and R2 and may be selected to ensure that the DAA circuitry does not overload before the maximum ring threshold is exceeded with the peak DC potential on the line. As described below, a minimum division factor of about 65 may be desirable in one exemplary embodiment, with a selected divider ratio of about 72 being implemented to provide additional headroom.

It will be understood that resistive interface circuit block 650 represents just one exemplary embodiment of a resistive interface configuration that may be implemented, for example, as a common interface for coupling DC loop voltage, ring bursts and caller-ID data to the line side chip of DAA circuitry. In this regard, a resistive interface may have any configuration suitable for passing direct current and maintaining polarity information. In one embodiment, a resistive interface may include a single pair of resistors between TIP/RING and corresponding components on the line side of the DAA. In other embodiments, a greater number of resistors (e.g., more than a single pair of resistors) may be so employed.

In the embodiment of FIG. 6A, the linearly divided TIP/RING potential contains the DC loop voltage, ring bursts and caller-ID data. Exemplary ranges of magnitudes and frequencies for these signals is summarized below (it being understood that other values of magnitude and frequency are also possible):

Loop voltage: 0–87 V, DC
RING Bursts: 20 Vrms–140 Vrms, 16 Hz–68 Hz
Caller-ID data: 12 mVrms–476 mVrms, 1200 Hz and 2200 Hz It will be understood that the disclosed interface and circuit architecture may be configured to support one or more ring thresholds having values selected to fit a given application. However, in one exemplary embodiment that may be employed to accommodate global ring detection requirements, two ring thresholds may be supported: 15.0 Vrms and 21.5 Vrms. In this exemplary embodiment, once the ring burst has reached this magnitude, the divider formed by the resistive interface circuit block 650 no longer needs to function linearly since caller-ID signaling does not occur during a ring burst. Thus, the maximum potential on the line that should be attenuated linearly may be given by the sum of the peak DC loop voltage and the maximum peak ring threshold, or 117.4 V in this embodiment.

The supply voltage for the circuitry shown in FIG. 6A is generated by power transmitted across the isolation barrier and in one exemplary embodiment may be as low as 1.8 V. In this exemplary embodiment, the divider should be configured to attenuate 117.4 V on TIP/RING down to less than 1.8 V on chip to prevent the protection diodes from turning on, meaning that a divider ratio of at least 65 is required (a divider ratio of 72 may be selected to account for component tolerances and to allow some headroom for the on-chip circuitry). As illustrated in FIG. 6A, a 20MΩ value of R1 may be chosen to meet current global on-hook DC impedance requirements (worst case is 5 μa@ 100 V), resulting in a value of 280KΩ for R2. A 20MΩ load impedance on TIP/RING may also be selected to not interfere with the transmission or reception of normal audio, and to protect the line side chip against lightning and other surges.

For the above-described exemplary embodiment, once the DC loop voltage, ring bursts, and caller-ID data are coupled on chip through a common interface, the ratio of the maximum to minimum signal levels that must be linearly processed is given by:

$$\frac{\text{Maximum Signal}}{\text{Minimum Signal}} \geq 20\log_{10}\left[\frac{87+30.4}{\sqrt{2}\cdot 0.012}\right] = 77\text{dB}.$$

The dynamic range is further increased since caller-ID data is FSK modulated and requires a signal to noise ratio of approximately 25 dB to be decoded reliably. Therefore, to process all three signals requires a dynamic range of over 100 dB. However, the disclosed interface and circuit of FIG. 6A may be advantageously implemented to use the frequency diversity of the loop voltage and ring bursts versus the caller-ID signal to minimize the dynamic range requirement. In this regard, the linearly divided loop voltage and ring bursts may be communicated to combined loop voltage and ringer detection circuitry inputs 684 and 686 of line side combined loop voltage monitoring and ringer detection circuitry 692 where the loop voltage and ring bursts may be directly converted to digital format, for example, in line side $1^{st}$ order delta-sigma ADC 634 of circuit 600. The resulting bit stream may then be sent across isolation barrier 120 to the system side chip to $1^{st}$ order sinc filter and ring detect logic 636 for decimation and ring validation. In one exemplary embodiment, the dynamic range required of $1^{st}$ order delta-sigma ADC 634 is determined only by the resolution required in the DC loop voltage measurement (i.e., 1 V) and the desired accuracy of the ring threshold (i.e., ±10%). Since 10% of the ring threshold is greater than 1 V, the loop voltage measurement drives the resolution requirement. As indicated above, the minimum full-scale range of $1^{st}$ order delta-sigma ADC 634 is 117.4 V, but a larger full-scale range (e.g., 128 V) may be selected to account for component tolerances. Therefore, in one embodiment an 8-bit converter having an input range of −128 V to +127 V in one volt steps may be employed as $1^{st}$ order delta-sigma ADC 634.

Once on-chip, the caller-ID signal is communicated to caller ID circuitry input lines 680 and 682 of caller ID circuitry 690 where the caller ID signal may be separated from the DC loop voltage and ring bursts using a highpass filter 640 (e.g., 120 Hz), sent through gain block 620, and converted to digital format in $2^{nd}$ order delta-sigma caller-ID ADC 610. The resulting bitstream is sent across the isolation barrier to the system side chip for decimation of the caller-ID data. In one embodiment, a common digital decimation filter on the system side may be used for decimation of caller-ID data and the primary data (such as voice or modem data) flow.

In one embodiment, highpass filter 640 may not attenuate ring bursts enough to prevent the $2^{nd}$ order delta-sigma caller-ID ADC 610 from being overloaded, however this is not a problem as long as $2^{nd}$ order delta-sigma caller-ID ADC 610 recovers within 100 msec of a ring burst or polarity reversal. Therefore, the range of caller-ID signal magnitudes and the minimum signal to noise required to demodulate the FSK data may be used to primarily determine the required dynamic range of the $2^{nd}$ order delta-sigma caller-ID ADC 610. Furthermore, the presence of interference may be taken into account when configuring $2^{nd}$ order delta-sigma caller-ID ADC 610. For example, in one exemplary embodiment, a 60 Hz interference tone with a magnitude of up to 1.589 Vms may be present on the line during caller-ID signaling, and when interference is present the maximum caller-ID signal level may be reduced to 200 mVrms. Taking these factors into account, the minimum dynamic range of the $2^{nd}$ order delta-sigma caller-ID ADC 610 in one exemplary embodiment may be estimated as follows:

$$\text{CID Dynamic Range} \geq 20\log_{10}\left[\frac{1.589\cdot 0.51+0.2}{0.012}\right] + 25\text{dB} = 64\text{dB}.$$

In the preceding equation, the factor of 0.51 may be employed to account for the minimum attenuation of the 120 Hz highpass filter at 60 Hz given the expected component tolerances. Therefore, for this exemplary embodiment, a converter with 11 effective bits and a full scale range of +1.06 Vrms (1.5 pk) may be employed.

Advantageously, the above 64 dB dynamic range required is much less than the 100 dB+dynamic range that would be required if caller-ID data was not separated prior to processing. For the switched capacitor implementation employed in this embodiment, every increase of 3 dB in signal to noise required translates to twice the capacitor area and twice the power dissipation. Thus, although a separate circuit is used to process the caller-ID data, the reduction in dynamic range required of both ADC's 610 and 634 results in an area and power savings over a single ADC approach. The placement of the more complex ring validation, timing, decimation, and caller-ID decoding circuitry on the system side chip results in lower power dissipation on the line side. This is desirable since it decreases the amount of power that must be transmitted across the isolation barrier and minimizes the common mode noise transmitted to the TIP/RING lines.

In the implementation of the disclosed telephone line interface and circuitry, a resistor divider may have a grounded leg that is located either off-chip or on-chip. In the illustrated embodiment of FIG. 6A, resistors R2A and R2B of resistive interface circuit block 650 are located on-chip in order to minimize external components. In those cases where the on-chip resistors do not match the external resistors to the desired accuracy, the internal resistors may be calibrated, e.g., by calibration circuitry (not shown) that compares the internal resistors until the desired value is obtained. In this regard, resistor calibration may be performed on power up and/or may also be performed at other times. In those embodiments where calibrated internal resistors are required elsewhere in the line side chip, location of resistors R2 on-chip may require substantially no additional circuitry or external components.

Although protection diodes in the line side chip may turn on during the peaks of large ring signals or a battery reversal, no charge storage will occur due to the purely resistive interface. Therefore, as soon as the over voltage condition abates the divider will return the operating in a linear fashion almost immediately. In the illustrated embodiment, the time required after an over voltage event before caller-ID data can be decoded is limited only by the 120 Hz highpass filter 640 in the caller-ID signal path. The time constant of this filter is much less than the about time required (e.g., about 100 msec) for processing caller-ID data after a ring burst or battery reversal.

Figure 6B:
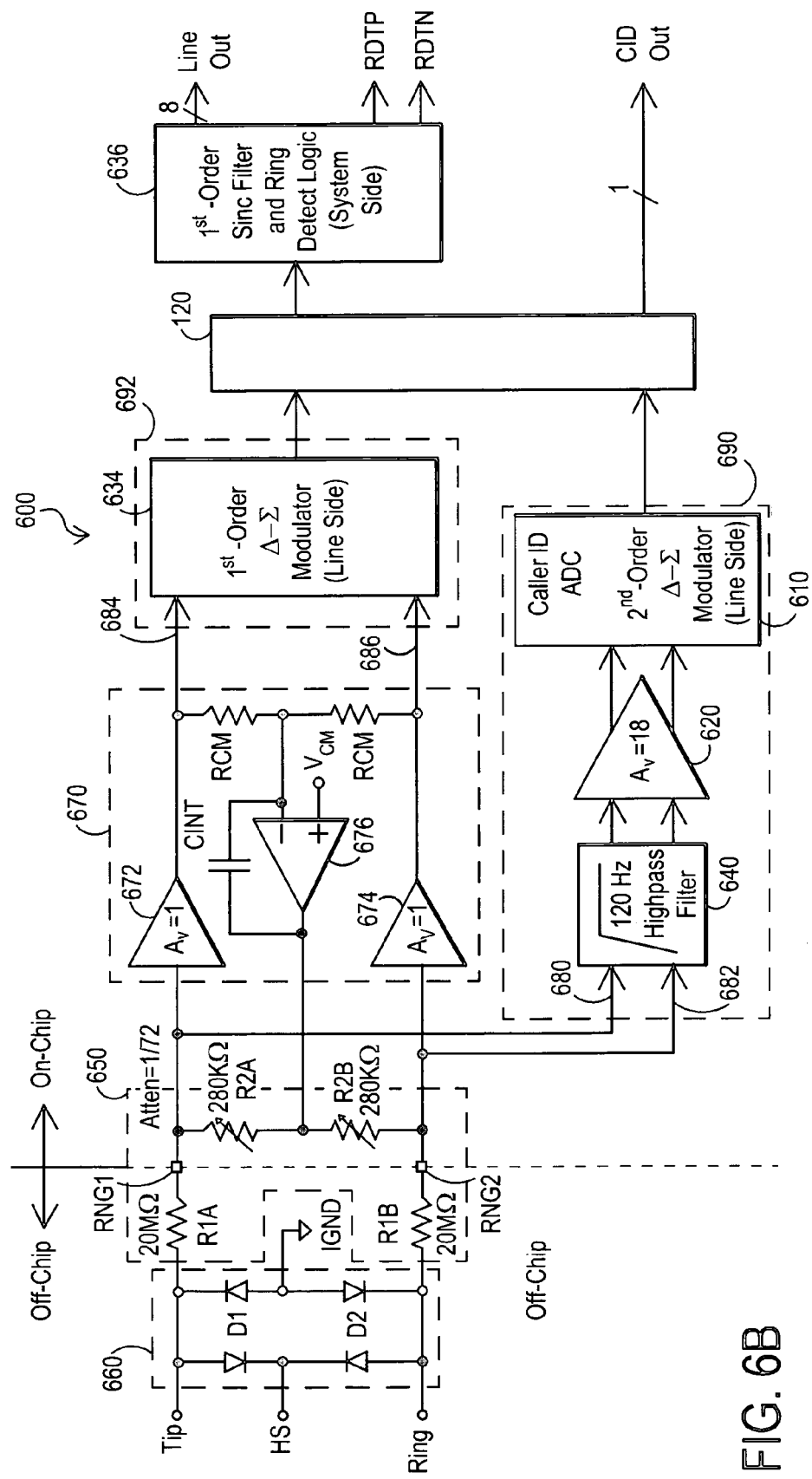
FIG. 6B is a circuit diagram of a telephone line interface and circuitry according to another embodiment of the disclosed systems and methods.

For ease of conceptualization and understanding, FIG. 6A presents a simplified embodiment of the disclosed telephone line interface and circuit architecture 600. In this regard, FIG. 6B shows a diagram of an alternate embodiment of the disclosed telephone line interface and circuit architecture 600 having diode bridge 660 (with diodes D1 and D2) coupled between the TIP and RING and resistive interface circuit block 650 and having an output HS to external hookswitch devices. FIG. 6B also shows common-mode feedback circuitry 670 coupled between resistive interface circuit block 650 and line side combined loop voltage monitoring and ringer detection circuitry 692. As shown, common-mode feedback circuitry 670 includes gain blocks 672 and 674, op-amp 676 coupled to common mode voltage $V_{CM}$, capacitor CINT and resistors RCM. In such an embodiment, resistive interface circuit block 650 provides a common mode feedback loop around resistors R2 to perform single-ended to differential conversion in the input, e.g., in one embodiment maintaining the voltages at RNG1 and RNG2 pins in a range of from about 0.111 V to about 1.889 V and preventing potential on the RNG1/RNG2 pins from going below IGND.

Figure 6C:
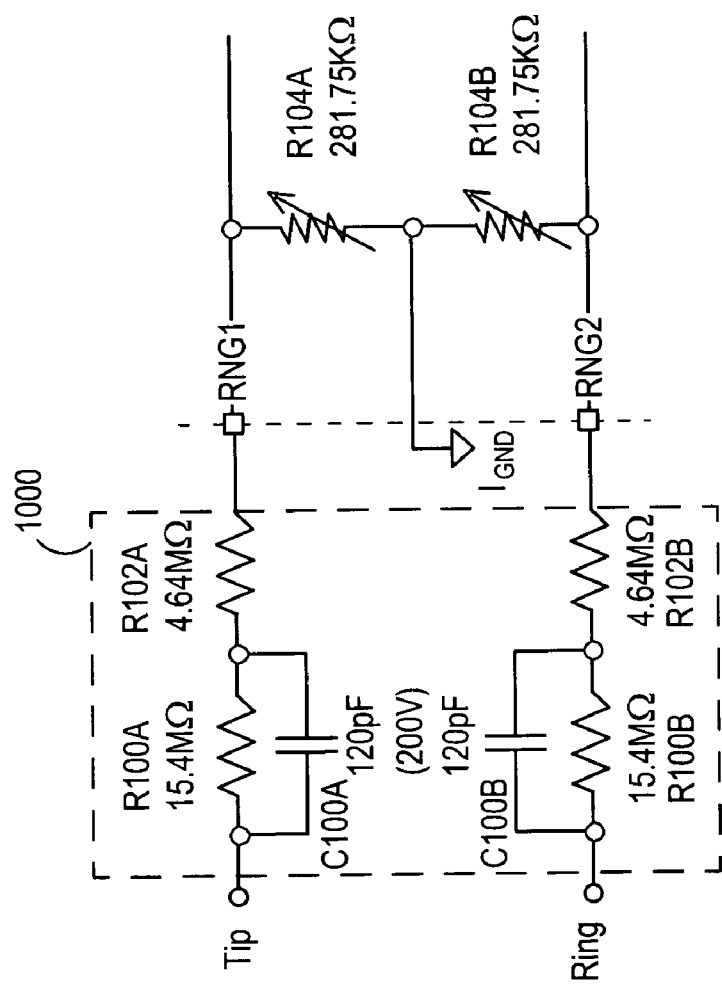
FIG. 6C is a circuit diagram of signal separator circuitry according to one embodiment of the disclosed systems and methods.

FIG. 6C illustrates an alternate embodiment which may be optionally implemented (e.g., with the disclosed telephone line interface and circuit architecture 600 of FIG. 6) to achieve high performance detection of caller ID signals. In this regard, FIG. 6C shows signal separator resistive interface circuitry 1000 that may be present to improve the S/N of caller ID signals (e.g., in one embodiment by about 18 dB) by increasing caller ID signal magnitude (e.g., in one embodiment by up to about 12 dB) in the caller ID signal frequency range (e.g., from about 100 Hz to about 30,000 Hz), and that results in a full scale caller ID $V_{PK}$=1.5 as opposed to a full scale caller ID $V_{PK}$=6.0 for the telephone line interface and circuit architecture 600 of FIG. 6A.

As illustrated, the signal separator resistive interface circuitry 1000 of FIG. 6C includes resistors R100A, R100B, R102A, R102B and capacitors C100A, C100B coupled between TIP and RING and integrated circuit pins RNG1 and RNG2 in the manner shown. Also illustrated are internal varistors R104A and R104B, corresponding to varistors R2 of FIG. 6A. In one exemplary embodiment, the illustrated external input circuitry 1000 may be implemented with telephone line interface and circuit architecture 600 of FIG. 6A. In such an embodiment, the components of signal separator circuitry 1000 may replace resistors R1A and R1B coupled to TIP and RING of circuit 600 of FIG. 6A, and may have the resistor and capacitor component values shown in FIG. 6C. However, it will be understood that these component values are exemplary only and that signal separator resistive interface circuitry 1000 may be implemented with other telephone line interface configurations, such as those described elsewhere herein.

Figure 6D:
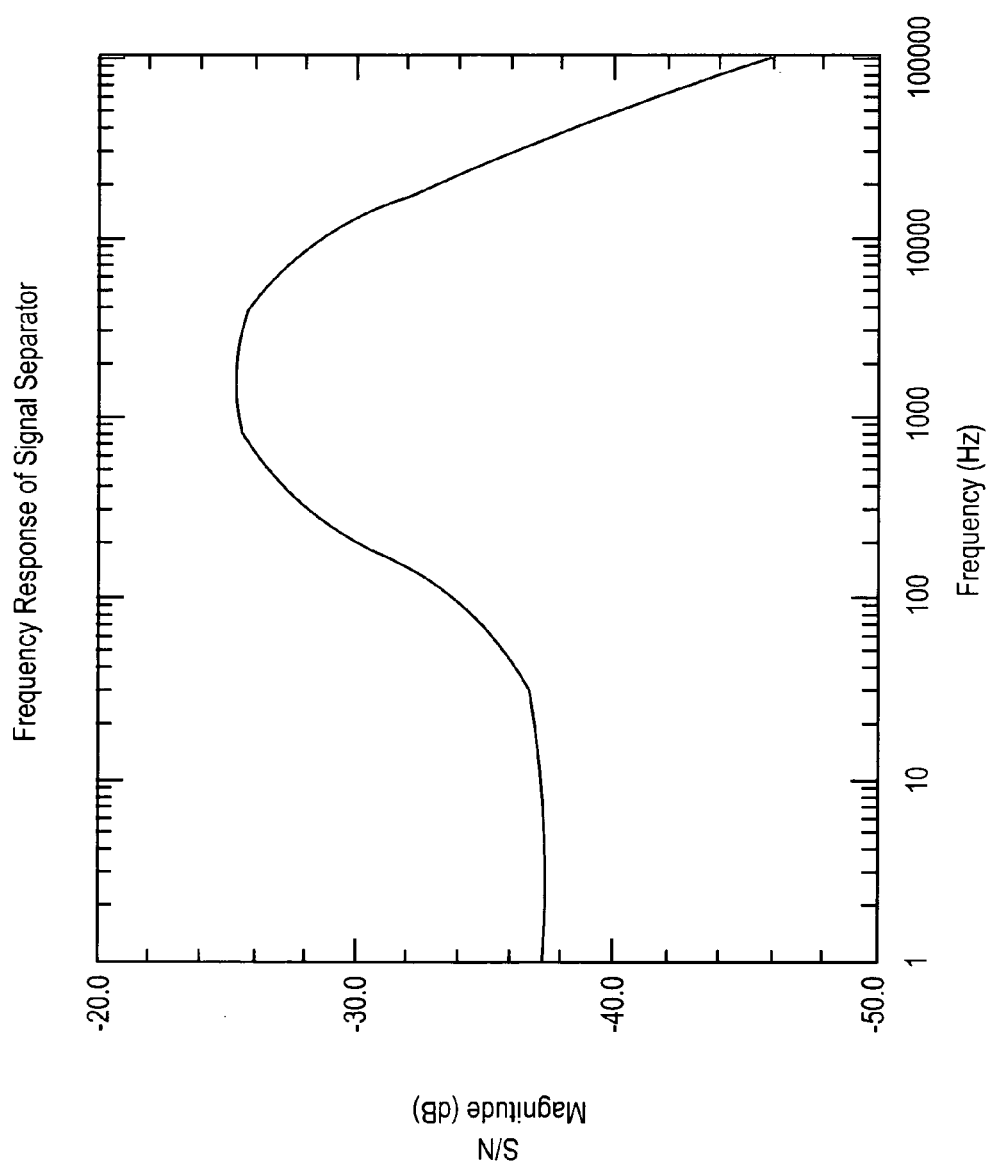
FIG. 6D illustrates frequency response for the signal separator circuitry of FIG. 6C according to one embodiment of the disclosed systems and methods.

FIG. 6D illustrates frequency response for the exemplary embodiment of signal separator resistive interface circuitry 1000 of FIG. 6C, showing increased S/N ratio in the caller ID signal frequency range (e.g., from about 100 Hz to about 30,000 Hz). This increased frequency response may be advantageously employed, for example, to improve processing of relatively weak caller ID signals that would otherwise be further attenuated, e.g., by resistive interface circuit block 650 of telephone line interface and circuit architecture 600 of FIG. 6A.

Figure 7A:
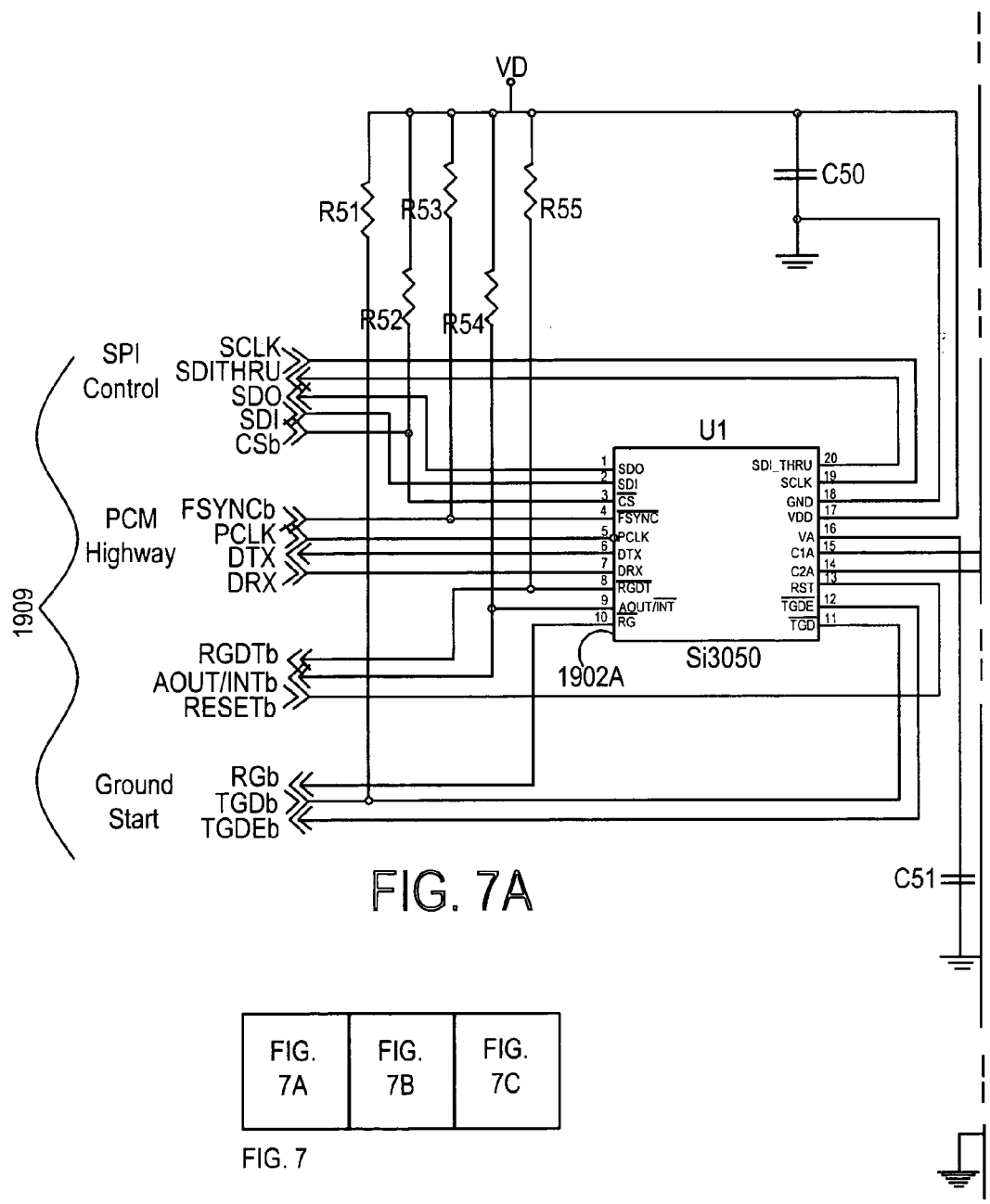
FIG. 7 is a general circuit diagram of digital DAA circuitry implemented with the telephone line interface and circuitry of FIG. 6A according to one embodiment of the disclosed systems and methods.
Figure 7B:
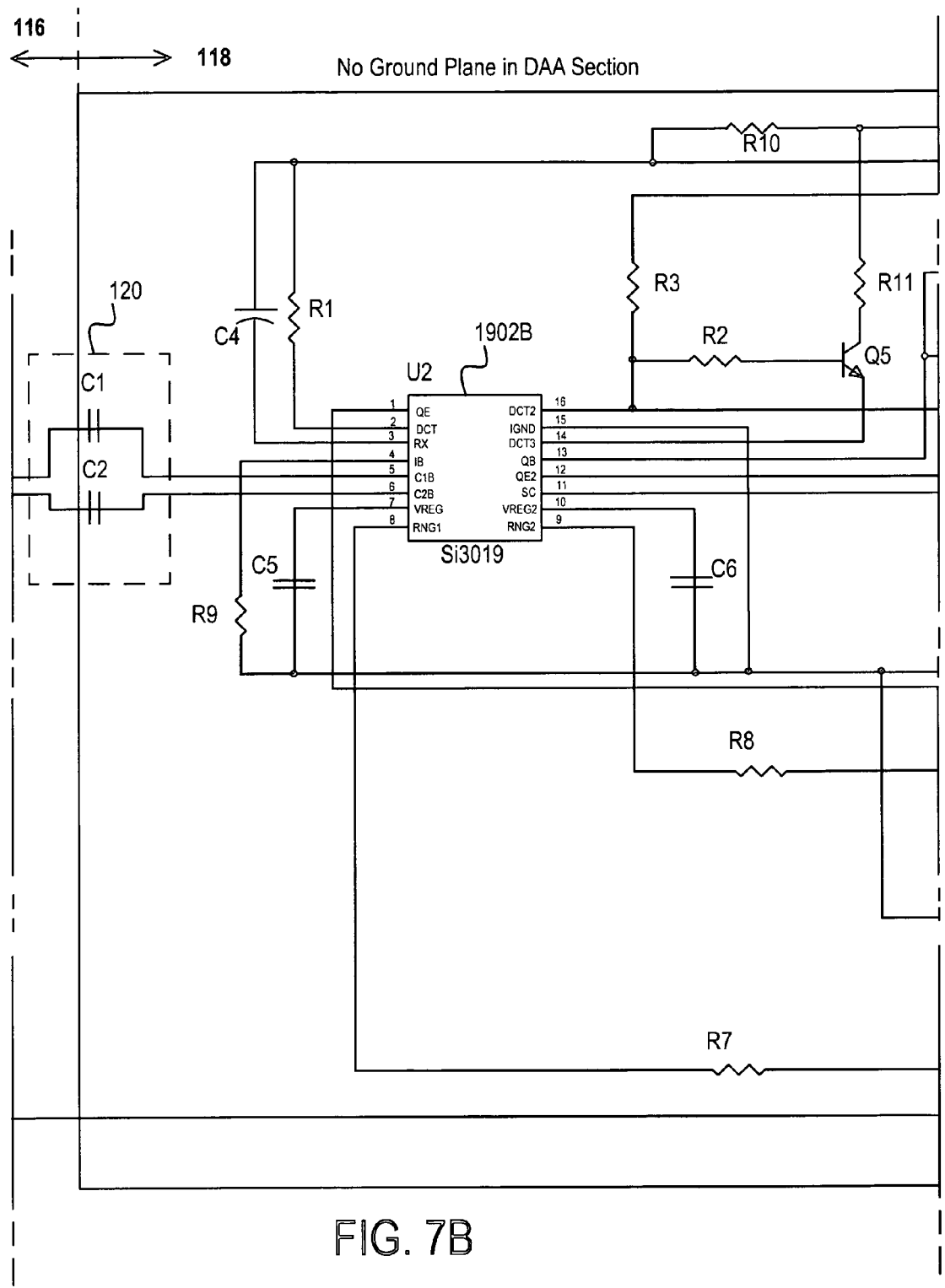
Figure 7C:
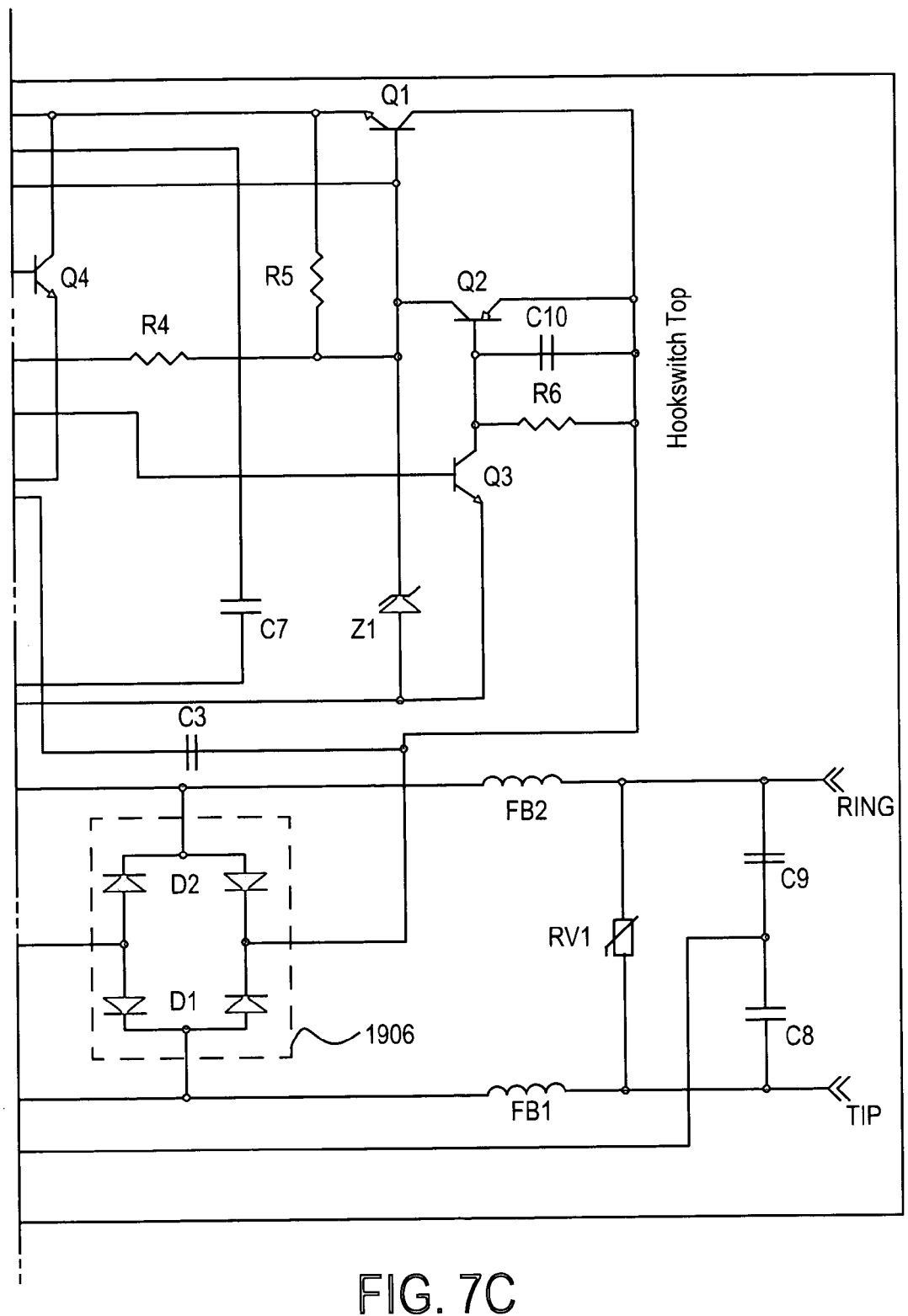

FIG. 7 is a general circuit diagram illustrating an example digital DAA circuitry 110 as it may be implemented to include telephone line interface and circuit architecture 600 of FIG. 6A according to one embodiment of the disclosed systems and methods. However, it will be understood that the DAA circuitry of FIG. 7 is exemplary only, and that embodiments of the disclosed telephone line interface and associated circuitry may be implemented with other DAA circuitry configurations. Examples of such DAA circuitry configurations include, but are not limited to, DAA circuitry described in U.S. Pat. No. 6,198,816, U.S. Pat. No. 6,298,133, U.S. Pat. No. 6,385,235; in U.S. patent application Ser. No. 09/347,688 filed Jan. 2, 1999 and entitled "DIGITAL ACCESS ARRANGEMENT CIRCUITRY AND METHOD HAVING A SYNTHESIZED RINGER IMPEDANCE FOR CONNECTING TO PHONE LINES" by Tuttle et al.; the disclosure of each of the foregoing being incorporated herein by reference. Other examples of DAA circuit types with which the disclosed DC holding circuitry may be employed include, but are not limited to, DAA circuits that do not utilize capacitance isolation as would be recognized by those of skill in the art with benefit of this disclosure.

DAA circuit 110 of FIG. 7 includes two integrated circuits (ICs), a capacitive isolation barrier 120, and may be coupled to phone line TIP and RING lines as shown. In the illustrated embodiment of FIG. 7, powered side circuitry 116 may include a powered side IC 1902A, and telephone line side circuit 118 may include a phone line side IC 1902B. External discrete devices may be coupled to the TIP line, RING line, phone line side IC 1902B and powered side IC 1902A. The external circuitry may include circuitry, such as hookswitch circuitry and diode bridge circuitry 1906.

In the exemplary DAA circuitry embodiment depicted in FIG. 7, external pins 1909 of the powered side IC 1902A are connected to an external digital signal processor (DSP) and/or to an external application specific IC (ASIC) or controller. The isolation barrier 120 includes a first barrier capacitor (C1) connecting an external signal (C1A) pin on the powered side IC 1902A to an external signal (C1B) pin on the phone line side IC 1902B. In addition, the isolation barrier 120 has a second barrier capacitor (C2) connecting an external signal (C2A) pin on the powered side IC 1902A to an external signal (C2B) pin on the phone line side IC 1902B. In the embodiment of FIG. 7, differential signals across capacitors C1 and C2 may be used to communicate between IC 1902A and IC 1902B. The ground (GND) pin of powered side IC 1902A may be connected to the system digital ground. Regulator voltage reference (VA) pin of powered side IC 1902A may be connected to external capacitor C51 and serve as the reference for the internal voltage regulator. Digital supply voltage (VDD) pin may be present on powered side IC 1902A to provide digital supply voltage (e.g., 3.3 V) to powered side IC 1902A. In addition, the isolated ground (IGND) pin of phone line side IC 1902B may be connected to a node within diode circuitry 1906 (and thereby be connected to the phone line). Also shown is external line side capacitor C3 that is coupled between TIP and RING of telephone line side circuit 118 and phone line side IC 1902B, with diodes of diode bridge circuitry 1906 being coupled between the TIP and RING and external line side capacitor C3. In one exemplary embodiment, external line side capacitor C3 may be a capacitor having a breakdown voltage of about 300 volts, although capacitors having other breakdown voltage values are possible in other embodiments. Typical component values for the various external capacitors, resistors, transistors, and diodes for exemplary DAA circuit of FIG. 7 are shown in Table 1. The identity and values of the components listed in Table 1 are exemplary only, and it will be understood that benefits of the disclosed telephone line interface systems and methods may be practiced with different combinations of components and/or values thereof.

TABLE 1

External Component Values for DAA Circuit of FIG. 7

| Component | Value |
| --- | --- |
| C1, C2 | 33 pF, Y2, X7R, ±20% |
| C3 | 3.9 nF, 250 V, X7R, ±20% |
| C4 | 1.0 uF, 50 V, Elec/Tant, ±20% |
| C5, C6, C50, C51 | 0.1 uF, 16 V, X7R, ±20% |
| C7 | 2.7 nF, 50 V, X7R, 20% |
| C8, C9 | 680 pF, Y2, X7R, ±10% |
| C10 | 0.01 uF, 16 V, X7R, ±20% |
| D1, D2 | Dual Diode, 225 mA, 300 V, CMPD2004 |
| FB1, FB2 | Ferrite Bead, BLM31A601S |
| Q1, Q3 | NPN, 300 V, MMBTA42 |
| Q2 | PNP, 300 V, MMBTA92 |
| Q4, Q5 | NPN, 60 V, 330 mW, MMBT2484 |
| RV1 | Sidactor, 275 V, 100 A |
| R1 | 1.07 KΩ, ½ W, 1% |
| R2 | 150 Ω, ¹⁄₁₆ W, 5% |
| R3 | 3.65 KΩ, ½ W, 1% |
| R4 | 2.49 KΩ, ½ W, 1% |

TABLE 1-continued

External Component Values for DAA Circuit of FIG. 7

| Component | Value |
| --- | --- |
| R5, R6 | 100 KΩ, ¹⁄₁₆ W, 5% |
| R7, R8 | 20 MΩ, ¹⁄₁₆ W, 5% |
| R9 | 1 MΩ, ¹⁄₁₆ W, 1% |
| R10 | 536 Ω, ¼ W, 1% |
| R11 | 73.2 Ω, ½ W, 1% |
| R51, R52, R53, R54, R55 | 4.7 KΩ, ¹⁄₁₀ W, 5% |
| Z1 | Zener Diode, 43 V, ½ W, BZX52C43 |

In the embodiment illustrated and described above with respect to FIGS. 6 and 7, telephone line interface and circuit 600 is shown partially integrated into a phone line and system side IC's of DAA circuitry, in this case phone line side IC 1902B and system side IC 1902A of DAA circuitry of FIG. 7. However, it will be understood that in other embodiments the disclosed DC holding circuitry may be implemented in any manner suitable for achieving one or more of the features described herein, e.g., as circuitry external to a phone line IC and/or system side IC, as circuitry entirely integrated into a phone line IC and/or system side IC, etc. It will be also understood that other components may be optionally present within the disclosed telephone line interface and circuitry as necessary or desired to fit particular applications or to achieve particular capabilities.

Although described herein with respect to the exemplary embodiment of FIGS. 6 and 7, it will be understood that the disclosed telephone line interface and circuitry and method for use thereof may be employed in any DAA circuit configuration to independently or cooperatively achieve one or more of the features described herein, e.g., to combine the processing of DC loop voltage and ring bursts into a single circuit, and/or to implement a single resistively coupled interface to couple DC loop voltage/ring bursts/caller-ID data to the phone line side of DAA circuitry with reduced component complexity and cost, etc. For example, a single common resistively coupled interface may be employed to coupled DC loop voltage data, ring burst data and caller-ID data to the phone line side of DAA circuitry having separate circuitry and associated circuit inputs for performing each of respective loop voltage monitoring, ring burst detection and caller-ID processing tasks.

It will also be understood that the typical internal and external component values disclosed herein are exemplary only. Furthermore, in the practice of the disclosed telephone line interface and circuit and methods of use thereof, the number, type and/or configuration of internal and/or external components (e.g., resistors, transistors, capacitors, ADC's, etc.) may be varied to achieve one or more characteristics of a telephone line interface and circuitry as may be desirable to fit a particular application/s. For example, it will be understood that in other embodiments the disclosed systems and methods may be practiced with DAA circuitry having only one barrier capacitor, having more than two barrier capacitors, and/or having isolation elements other than capacitors. Further, it will be understood that particular circuitry embodiments illustrated and described herein (e.g., resistive interface circuitry 650, caller ID circuitry 690, combined loop voltage monitoring and ringer detection circuitry 692, signal separator resistive interface circuitry 1000, etc.) are exemplary only, and that any alternate circuit configuration suitable for implementing or performing the described tasks of one or more of these circuits may be employed in other embodiments of the disclosed systems and methods.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention. Moreover, the various aspects of the inventions disclosed herein may be used in combination or separately as will also be apparent to those skilled in the art.

I claim:

1. A communication system, comprising:
   phone line side circuitry that may be coupled to a telephone network;
   ringer detection circuitry included within the phone line side circuitry;
   DC loop voltage monitoring circuitry included within the phone line side circuitry; and
   caller ID circuitry included within the phone line side circuitry;
   wherein said ringer detection circuitry, DC loop voltage monitoring circuitry and caller ID circuitry are configured to be coupled to said telephone network through a common integrated circuit input node and a common interface coupled between said common integrated circuit input node and said telephone network, said common interface providing direct current to said common integrated circuit input node; and
   wherein said ringer detection circuitry, DC loop voltage monitoring circuitry and caller ID circuitry are configured to receive caller ID data, DC loop voltage data and ringer data from said telephone network through said common integrated circuit input node.

2. The communication system of claim 1, wherein said common interface comprises common resistive interface circuitry.

3. The communication system of claim 2, wherein each of said ringer detection circuitry, DC loop voltage monitoring circuitry and caller ID circuitry are integrated within said phone line side circuitry.

4. The communication system of claim 1, wherein said common interface comprises signal separator resistive interface circuitry.

5. The communication system of claim 3, further comprising powered side circuitry and an isolation barrier, said powered side circuitry being coupled to the phone line side circuitry through said isolation barrier.

6. The communication system of claim 5, wherein said phone line side circuitry includes hookswitch circuitry and comprises a part of DAA circuitry; and wherein said hookswitch circuitry is configured to be coupled to said telephone network through an interface that is separate from said common resistive interface circuitry.

7. The communication system of claim 5, wherein said isolation barrier comprises a capacitive isolation barrier.

8. The communication system of claim 3, wherein said DC loop voltage monitoring circuitry and ringer detection circuitry comprise combined DC loop voltage monitoring and ringer detection circuitry; and wherein said combined DC loop voltage and ringer detection circuitry and said caller ID circuitry are configured to be coupled to said telephone network through said common resistive interface circuitry.

9. An interface architecture for connecting an integrated circuit to a phone line, comprising:
   a caller ID circuitry input;
   a ring detection circuitry input;
   a DC loop voltage monitoring circuitry input; and
   a common integrated circuit input node coupled to each of the caller ID circuitry input, ring detection circuitry input and DC loop voltage monitoring circuitry input, the inputs configured to receive a common attenuated signal representative of data on TIP and RING phone lines from said TIP and RING phone lines through said common integrated circuit input node, and said common integrated circuit input node receiving direct current from said TIP and RING phone lines.

10. The architecture of claim 9, further comprising a common resistive interface coupled between the integrated circuit input node and the TIP and RING phone lines, the common resistive interface linearly attenuating data on the TIP and RING phone lines.

11. The architecture of claim 10, wherein said common resistive interface comprises signal separator resistive interface circuitry.

12. The architecture of claim 10, further comprising a filter coupled between said phone lines and said caller ID circuitry input, said filter being configured to filter out DC loop voltage data and ringer data from caller ID data.

13. A method for providing caller ID, DC loop voltage and ringer data from a telephone network to phone line circuitry coupled to said telephone network through an interface, comprising:
   providing caller ID data from the telephone network to caller ID circuitry included within said phone line circuitry;
   providing DC loop voltage data from the telephone network to DC loop voltage monitoring circuitry included within said phone line circuitry; and
   providing ringer data from the telephone network to ring detection circuitry within said phone line circuitry;
   wherein said ringer detection circuitry, DC loop voltage monitoring circuitry and caller ID circuitry of said phone line circuitry are coupled to said telephone network through a common integrated circuit input node and a common interface, and wherein said caller ID data, said DC loop voltage data and said ringer data are provided from said telephone network to said ringer detection circuitry, DC loop voltage monitoring circuitry and caller ID circuitry through said common interface and through said common integrated circuit input node; and
   wherein said common interface provides direct current to said common integrated circuit input node.

14. The method of claim 13, wherein said common interface comprises common resistive interface circuitry; and wherein said method further comprises linearly attenuating data provided from said telephone network through said common resistive interface circuitry.

15. The method of claim 14, wherein each of said ringer detection circuitry, DC loop voltage monitoring circuitry and caller ID circuitry are integrated within said phone line side circuitry.

16. The method of claim 13, wherein said method comprises providing a signal representative of said caller ID data from said telephone network to said caller ID circuitry; wherein said common interface comprises signal separator resistive interface circuitry; and wherein said method further comprises increasing a magnitude of said signal representing said caller ID data through said signal separator resistive interface circuitry.

17. The method of claim 15, wherein said phone line circuitry is coupled to powered side circuitry through an isolation barrier; and wherein said method further comprises communicating digital signals between said phone line circuitry and said powered side circuitry across said isolation barrier.

18. The method of claim 17, wherein said isolation barrier comprises a capacitive isolation barrier.

19. The method of claim 15, wherein said DC loop voltage monitoring circuitry and said ringer detection circuitry comprise combined DC loop voltage monitoring and ringer detection circuitry coupled to said telephone network through said common resistive interface circuitry; and wherein said method comprises providing said DC loop voltage data and said ringer data from said telephone network to said combined DC loop voltage and ringer detection circuitry through said common resistive interface circuitry.

20. The method of claim 14, wherein said phone line side circuitry includes hookswitch circuitry and comprises a part of DAA circuitry; wherein said hookswitch circuitry is configured to be coupled to said telephone network through an interface that is separate from said common resistive interface circuitry; and wherein said method further comprises providing said DC loop voltage data from the telephone network to said DC loop voltage monitoring circuitry during an off-hook condition of said hookswitch circuitry.

21. The method of claim 13, wherein said method further comprises filtering out said DC loop voltage data and said ringer data from said caller ID data before providing said caller ID data to said caller ID circuitry.

22. A communication system, comprising:
    phone line side circuitry that may be coupled to a telephone network;
    combined DC loop voltage monitoring and ringer detection circuitry included within the phone line side circuitry; and
    a common integrated circuit input node receiving direct current from said telephone network;
    wherein said combined DC loop voltage monitoring and ringer detection circuitry is configured to receive DC loop voltage data and ringer data from said telephone network through a said common integrated circuit input node.

23. The communication system of claim 22, further comprising caller ID circuitry included within the phone line side circuitry.

24. The communication system of claim 23, wherein said combined DC loop voltage monitoring and ringer detection circuitry and said caller ID circuitry are configured to be coupled to said telephone network through said common integrated circuit input node and a common interface coupled between said common integrated circuit input node and said telephone network.

25. The communication system of claim 24, wherein said common interface comprises common resistive interface circuitry.

26. The communication system of claim 23, wherein each of said combined DC loop voltage monitoring and ringer detection circuitry and said caller ID circuitry are integrated within said phone line side circuitry.

27. The communication system of claim 26, wherein said combined DC loop voltage monitoring and ringer detection circuitry comprises a first analog to digital converter, and wherein said caller ID circuitry comprises a second analog to digital converter.

28. The communication system of claim 26, further comprising powered side circuitry and an isolation barrier, said powered side circuitry being coupled to the phone line side circuitry through said isolation barrier.

29. The communication system of claim 28, wherein said isolation barrier comprises a capacitive isolation barrier.

30. A method of operating a communication system that may be coupled to a telephone network, comprising:
    providing phone line side circuitry, said phone line circuitry including combined DC loop voltage monitoring and ringer detection circuitry within said phone line circuitry; and
    providing DC loop voltage data and ringer data from the telephone network through a common integrated circuit input node to said combined DC loop voltage monitoring and ringer detection circuitry included within said phone line circuitry, said common integrated circuit input node receiving direct current from said telephone network.

31. The method of claim 30, further comprising providing caller ID circuitry within the phone line side circuitry; and providing caller ID data from the telephone network to said caller ID circuitry included within said phone line circuitry.

32. The method of claim 31, wherein said caller ID circuitry and said combined DC loop voltage monitoring and ringer detection circuitry are coupled to said telephone network through said common integrated circuit input node and a common interface coupled between said common integrated circuit input node and said telephone network, and wherein said caller ID data, said DC loop voltage data and said ringer data are provided from said telephone network to said ringer detection circuitry, DC loop voltage monitoring circuitry and caller ID circuitry through said common interface and through said common integrated circuit input node.

33. The method of claim 32, wherein said common interface comprises common resistive interface circuitry; and wherein said method further comprises linearly attenuating data provided from said telephone network through said common resistive interface circuitry.

34. The method of claim 31, wherein each of said combined DC loop voltage monitoring and ringer detection circuitry and said caller ID circuitry are integrated within said phone line side circuitry.

35. The method of claim 34, wherein said method further comprises converting said DC loop voltage data and said ringer data to digital format in said combined DC loop voltage monitoring and ringer detection circuitry, and converting said caller ID data to digital format in said caller ID circuitry.

36. The method of claim 34, wherein said phone line circuitry is coupled to powered side circuitry through an isolation barrier; and wherein said method further comprises communicating digital signals between said phone line circuitry and said powered side circuitry across said isolation barrier.

37. The method of claim 36, wherein said isolation barrier comprises a capacitive isolation barrier.

* * * * *